(12) United States Patent
Colvin et al.

(10) Patent No.: US 10,570,704 B2
(45) Date of Patent: Feb. 25, 2020

(54) AUTOMATED FRACTURE PLANNING METHODS FOR MULTI-WELL FIELDS

(71) Applicant: Landmark Graphics Corporation, Houston, TX (US)

(72) Inventors: Richard Daniel Colvin, Dripping Springs, TX (US); DeWayne Edward Pratt, Littleton, CO (US); Steven Paul Crockett, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 197 days.

(21) Appl. No.: 15/509,304

(22) PCT Filed: Oct. 14, 2014

(86) PCT No.: PCT/US2014/060520
§ 371 (c)(1),
(2) Date: Mar. 7, 2017

(87) PCT Pub. No.: WO2016/060651
PCT Pub. Date: Apr. 21, 2016

(65) Prior Publication Data
US 2017/0284175 A1    Oct. 5, 2017

(51) Int. Cl.
*E21B 41/00* (2006.01)
*E21B 43/26* (2006.01)
(Continued)

(52) U.S. Cl.
CPC .......... *E21B 41/0092* (2013.01); *E21B 43/26* (2013.01); *E21B 43/305* (2013.01);
(Continued)

(58) Field of Classification Search
CPC .... E21B 41/0092; E21B 43/26; E21B 43/305; E21B 44/00; E21B 49/00; E21B 49/08; E21B 47/18; G01V 11/002
See application file for complete search history.

(56) References Cited

U.S. PATENT DOCUMENTS

| | | | |
|---|---|---|---|
| 9,394,774 B2 * | 7/2016 | Soliman | E21B 43/26 |
| 2005/0125209 A1 * | 6/2005 | Soliman | E21B 43/26 703/10 |

(Continued)

FOREIGN PATENT DOCUMENTS

| | | |
|---|---|---|
| WO | 2005054626 A1 | 6/2005 |
| WO | 2014121270 A2 | 8/2014 |

OTHER PUBLICATIONS

International Searching Authority, International Search Report and Written Opinion, International application No. PCT/US2014060520, which is a PCT parent of the instant application, dated Jul. 15, 2015.

(Continued)

*Primary Examiner* — Yong-Suk Ro
(74) *Attorney, Agent, or Firm* — Kilpatrick Townsend & Stockton LLP

(57) ABSTRACT

A method in accordance with some embodiments comprises receiving input parameters specifying fracturing requirements, electronically accessing formation data associated with a target formation, and using a computer processor to dynamically generate a fracturing plan for at least one of a plurality of boreholes in the target formation. The plan includes potential fracture locations and lengths that account for existing or planned fracture locations along others of the plurality of boreholes and that further account for the received input parameters and the accessed formation data. The method also comprises fracturing the target formation along the plurality of boreholes in accordance with the fracturing plan.

6 Claims, 8 Drawing Sheets

(51) Int. Cl.
*E21B 43/30* (2006.01)
*E21B 49/00* (2006.01)
*E21B 49/08* (2006.01)
*G01V 11/00* (2006.01)
*E21B 47/18* (2012.01)

(52) U.S. Cl.
CPC .............. *E21B 49/00* (2013.01); *E21B 49/08* (2013.01); *G01V 11/002* (2013.01); *E21B 47/18* (2013.01)

(56) References Cited

U.S. PATENT DOCUMENTS

| | | |
|---|---|---|
| 2008/0164021 A1 | 7/2008 | Dykstra |
| 2012/0305242 A1 | 12/2012 | Charara et al. |
| 2013/0062054 A1 | 3/2013 | Jo |
| 2013/0292124 A1 | 11/2013 | Bunger et al. |
| 2013/0304444 A1* | 11/2013 | Strobel .................. E21B 43/26 703/10 |
| 2014/0048270 A1 | 2/2014 | Soliman et al. |
| 2014/0231072 A1* | 8/2014 | Samuel .................. E21B 43/30 166/250.1 |
| 2014/0262232 A1 | 9/2014 | Dusterhoft et al. |
| 2016/0282512 A1* | 9/2016 | Donderici ............... E21B 43/26 |
| 2017/0227663 A1* | 8/2017 | Ma ......................... G01V 1/288 |
| 2017/0292362 A1* | 10/2017 | Aniket .................... E21B 44/00 |

OTHER PUBLICATIONS

Republique Francaise, INPI Institut National De La Propriete Industrielle, Rapport De Recherche Preliminaire, French Search Report, Application No. FR 1558626, entire document, which is a FR counterpart to the instant application, Feb. 16, 2018.

\* cited by examiner

550 { 
| List A | List B |
|---|---|
| A | B |
| C | D |
| F | E |

552 {
| List A | List B |
|---|---|
| A | D |
| C | E |
| F | |
| B | |

554 {
| List A | List B |
|---|---|
| C | D |
| F | E |
| B | |

556 {
| List A | List B |
|---|---|
| F | D |
| B | E |

558 {
| List A | List B |
|---|---|
| F | D |
| B | |
| E | |

560 {
| List A | List B |
|---|---|
| B | D |
| E | |

562 {
| List A | List B |
|---|---|
| E | D |

564 {
| List A | List B |
|---|---|
| E | |
| D | |

566 {
| List A | List B |
|---|---|
| D | |

568 {
| List A | List B |
|---|---|

FIG. 5B

AUTOMATED FRACTURE PLANNING METHODS FOR MULTI-WELL FIELDS

BACKGROUND

Much effort has been invested in developing technologies that enable the efficient production of as much hydrocarbon material as possible from a given oilfield. For instance, numerous wells are often drilled in close proximity to enhance yield. Often, the production from wells in low-permeability ("tight") formations may be made more efficient by creating and opening fractures around each well with a process known as hydraulic fracturing-popularly called "fracking." This process of fracturing the rock surrounding the well effectively expands the reach of the well and enables fluids that would otherwise have difficulty flowing through the pores of the rock to instead flow through the fractures and into the well.

Yet such fracturing may prove problematic with wells in close proximity, as low impedance flow paths between different wells ("short circuits") create undesirable pressure gradients that preclude optimal hydrocarbon yield rates. To prevent any possibility of short circuits, well spacings and fracture spacings are generally kept at values that minimize any interaction between wells, potentially leading to inefficient drainage of the reservoir. This conservative strategy is further motivated by the perceived need to limit the massive amount of formation data that would need to be thoroughly considered in the time-sensitive drilling context, where drillers and production personnel wish to maintain control and adaptability of drilling and completion specifications and parameters.

BRIEF DESCRIPTION OF THE DRAWINGS

Accordingly, there are disclosed in the accompanying drawings and in the following description automated fracture planning methods and systems to produce fracturing plans that enable prompt parameter adaptation while accommodating the available model information and accounting for the potential interactions of multiple wells in close proximity. In the drawings:

FIGS. 5B and 5C are illustrative tables and zippered fracturing plans used in conjunction with the illustrative algorithm of FIG. 5A, in accordance with embodiments.

Figure 1:
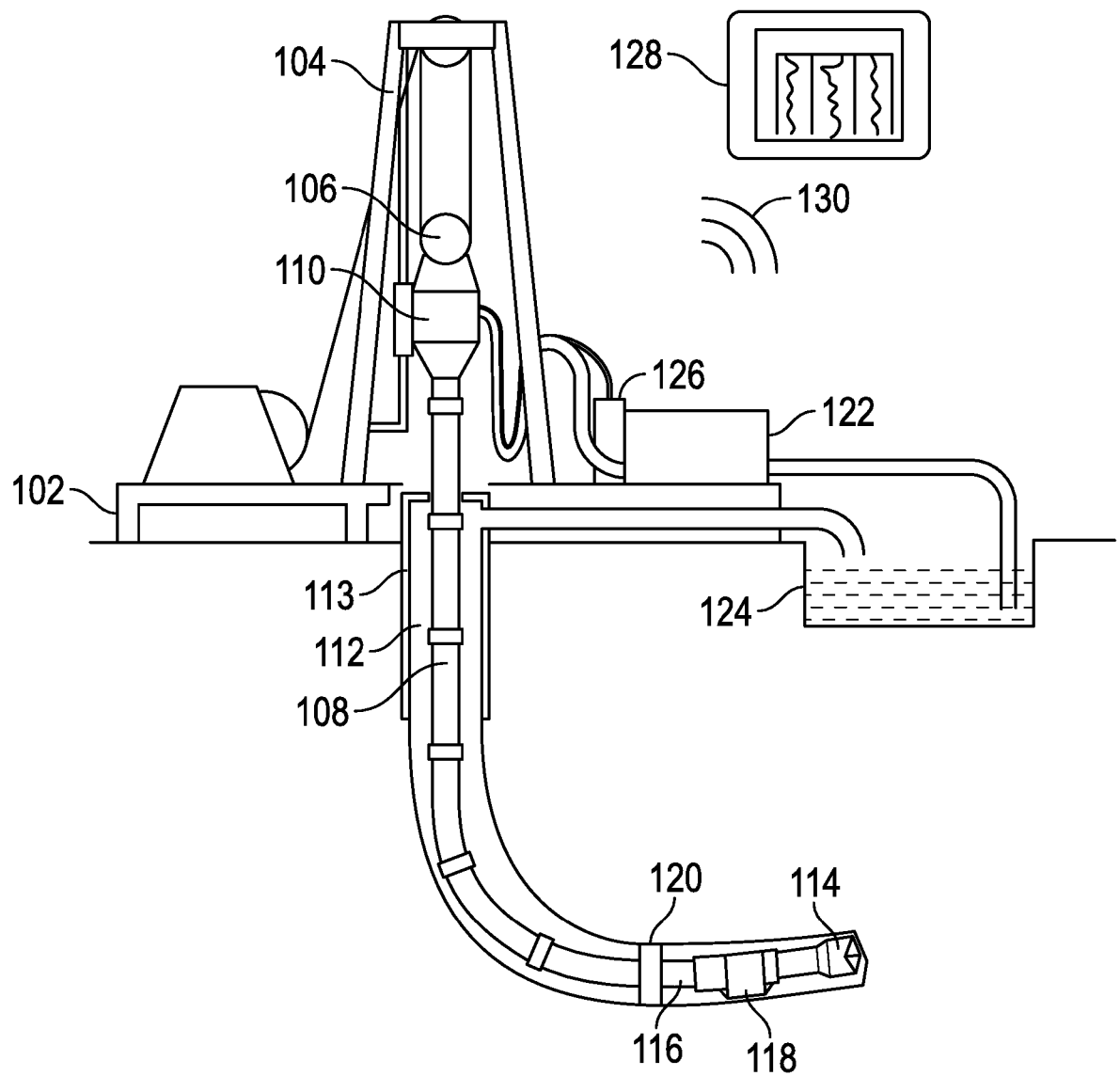
FIG. 1 is a schematic view of an illustrative drilling environment, in accordance with embodiments.

It should be understood, however, that the specific embodiments given in the drawings and detailed description do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The obstacles outlined above are addressed at least in part by the disclosed techniques for developing multi-well zippered fracturing plans. A multi-well zippered fracturing plan is a plan that specifies how each of multiple neighboring boreholes should be fractured, including the locations and lengths of such fractures. In some embodiments, a computer-implemented algorithm for developing such zippered fracturing plans includes sorting fractured and non-fractured boreholes into groups. The fractured boreholes are then analyzed in serial fashion to identify the presence of adjacent, non-fractured boreholes. Any such non-fractured boreholes are studied to determine whether and how they may be zipper fractured in accordance with specified parameters, formation data relating to the earth near the borehole, and fractures—whether already existing or planned—that are adjacent to that non-fractured borehole. Once a plan is developed for the non-fractured borehole, the borehole is re-classified as a fractured borehole.

To provide context and facilitate understanding of the present disclosure, FIG. 1 shows an illustrative drilling environment in which a drilling platform 102 supports a derrick 104 having a traveling block 106 for raising and lowering a drill string 108. A top-drive motor 110 supports and turns the drill string 108 as it is lowered into the borehole 112. The drill string's rotation, alone or in combination with the operation of a downhole motor, drives the drill bit 114 to extend the borehole. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via the annulus around the drill string 108, and into a retention pit 124. The drilling fluid transports cuttings from the borehole 112 into the retention pit 124 and aids in maintaining the integrity of the borehole. An upper portion of the borehole 112 is stabilized with a casing string 113 and the lower portion being drilled is open (uncased) borehole.

The drill collars in the BHA 116 are typically thick-walled steel pipe sections that provide weight and rigidity for the drilling process. The thick walls are also convenient sites for installing logging instruments that measure downhole conditions, various drilling parameters, and characteristics of the formations penetrated by the borehole. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. The most popular telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1a as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out the desired processing, modeling, and display generation.

Figure 2:
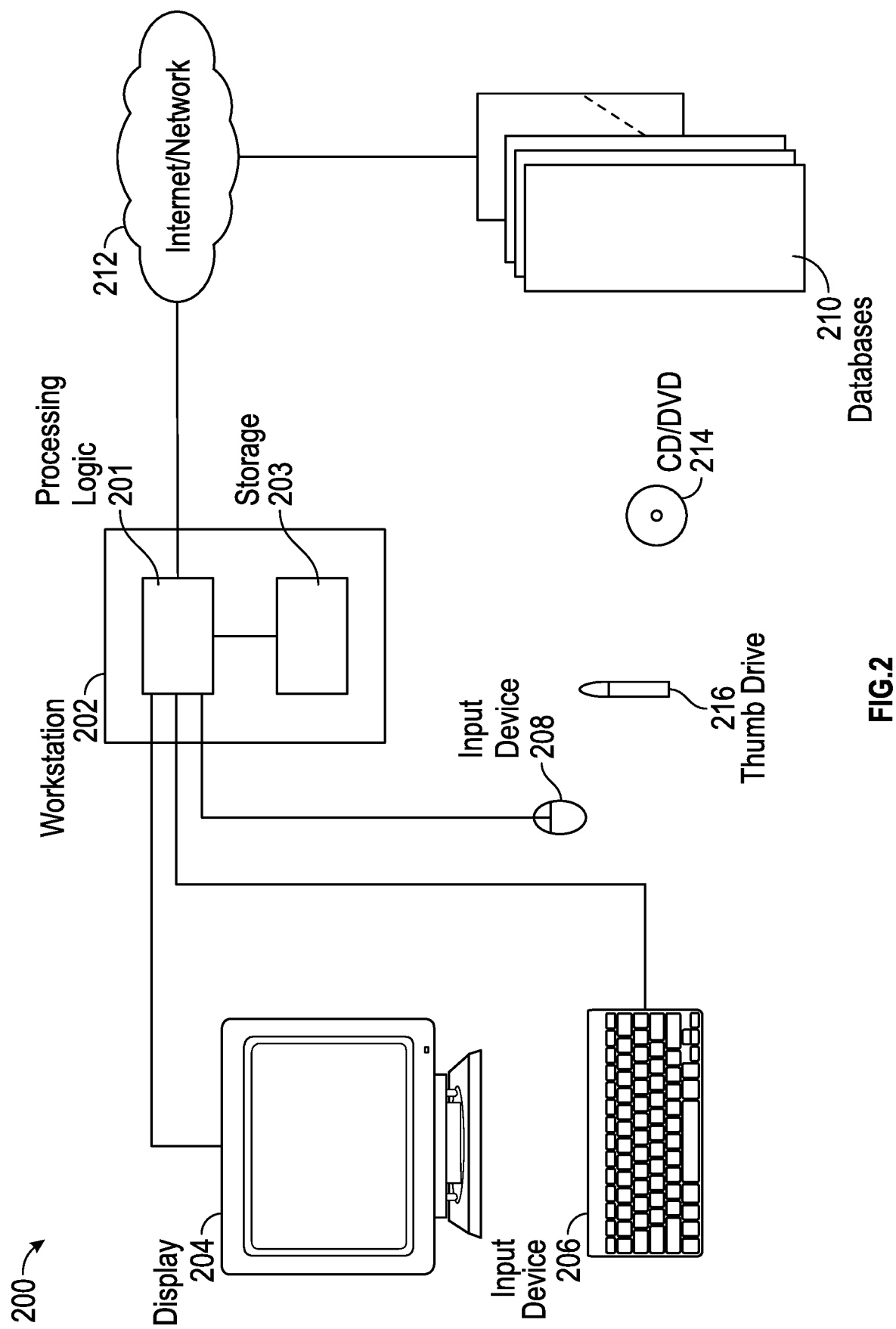
FIG. 2 is a block diagram of an illustrative surface control and monitoring system, in accordance with embodiments.

FIG. 2 is a diagram of an illustrative surface control and monitoring system 200. The system 200 comprises a computer workstation 202 that houses electronic circuitry such as processing logic 201 and non-transitory information storage 203. The processing logic 201 couples to a display 204 and input devices such as keyboard 206 and mouse 208. The processing logic 201 may read data from storage media such as CDs/DVDs 214 and thumb drives 216. Other input devices and storage media may be used in conjunction with the workstation 202 as well. The processing logic 201 couples to one or more databases 210 via the Internet or network 212. The databases 210 may be unified or distributed databases. The databases 210 may contain data usable by the methods described herein, such as formation data describing various characteristics—rock permeability, mineral distributions and make-ups, formation boundaries, formation surface features, formation rock type, formation fluid characteristics, and the like—of the formations within which boreholes are drilled. In some embodiments, such information is contained at least in part in storage 203 housed within the workstation 202. The processing logic 201 may read and execute software that encodes the method 500 (described with respect to FIGS. 5A-C below) and all suitable variations, modifications and equivalents of those methods. The CDs/DVDs 214, thumb drives 216, databases 210 and Internet/networks 212 may store some or all of the software encoding these methods.

Figure 3:
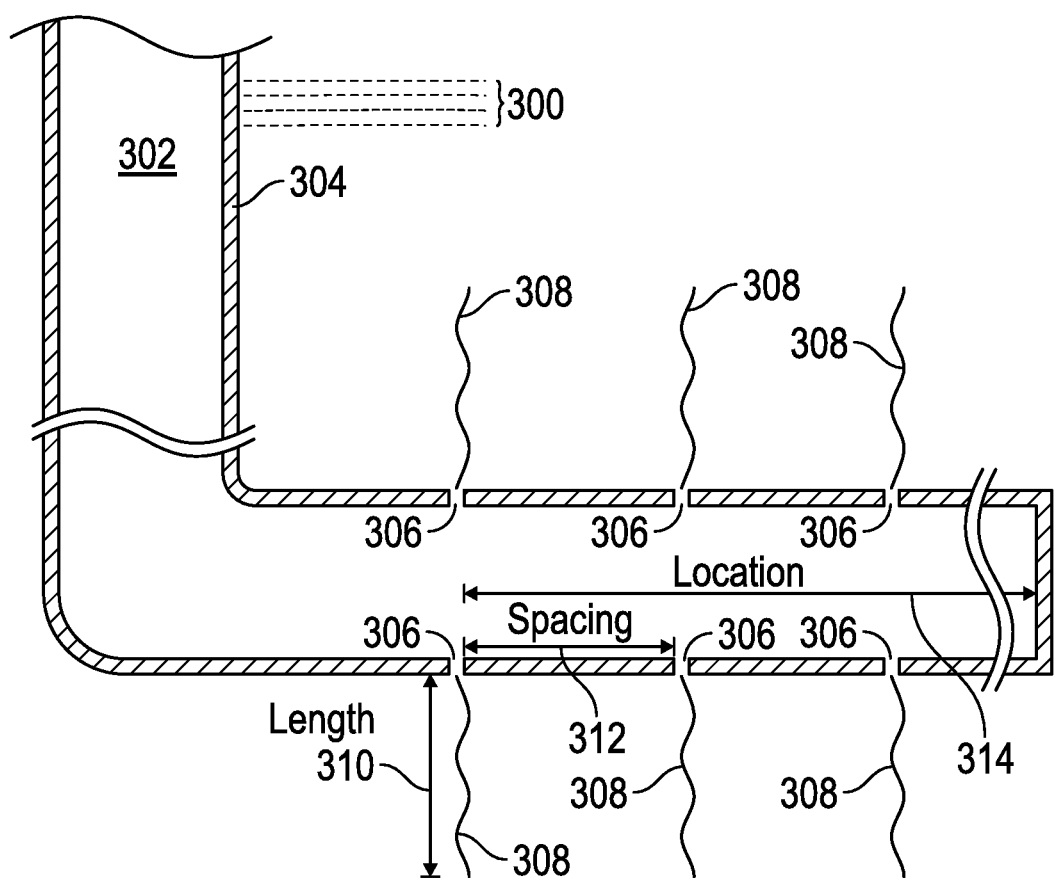
FIG. 3 is a cross-sectional view of an illustrative, fractured borehole, in accordance with embodiments.

FIG. 3 is a cross-sectional view of an illustrative, fractured borehole 302. The illustrative borehole 302 has been fully drilled, all drilling equipment has been removed, and the borehole 302 has been cased with casing 304 and cemented to sustain the structural integrity and stability of the borehole 302. The borehole 302 is formed within the earth and, more precisely, through target formation 300, which extends beyond the limited scope with which it is represented in FIG. 3. The target formation 300 may comprise multiple layers, each layer with a different type of rock formation, including the hydrocarbon-containing target formation within which the borehole may extend horizontally for some distance. The casing 304 contains multiple perforations 306 through which a fracturing fluid, such as water, is injected with high pressure into the target formation. This high-pressure fluid injection creates and opens fractures 308 that extend laterally through the target formation. The high-pressure fluid may contain additional chemicals and materials, such as a proppant material (e.g., sand) that maintains the structural stability of the fractures and prevents the fractures from fully collapsing. Typically, the horizontal portions of the borehole are drilled generally parallel to the direction of maximum stress, causing the fractures to propagate generally perpendicular to the borehole. (As fractures tend to propagate perpendicular to the direction of maximum stress, such propagation may be expected to occur at a predictable angle from the borehole axis when the borehole is not aligned with the maximum stress direction.) The overlying and underlying formation layers tend to resist fracture propagation, consequently fractures tend to propagate laterally within the target formation, to a length that depends on the rate and volume of the injected fracturing fluid.

Thus each fracture has a length 310 relative to the casing 304. Each fracture also has an initiation location 314 determined by the perforation position, which is typically measured relative to the distal end of the borehole 302. Where regular spacing is employed, the perforations (and hence the fracture initiation points) have a fixed spacing 312 between them. Though represented in the figures as generally planar, the actual fractures may be represented as a branching network having a form and size that depends not only on the properties of the fracturing injection stream, but also on the nature of the rocks and formation materials of the target formation. Accordingly, fracture shapes and sizes are not limited to those shown in FIG. 3.

Figure 4A:
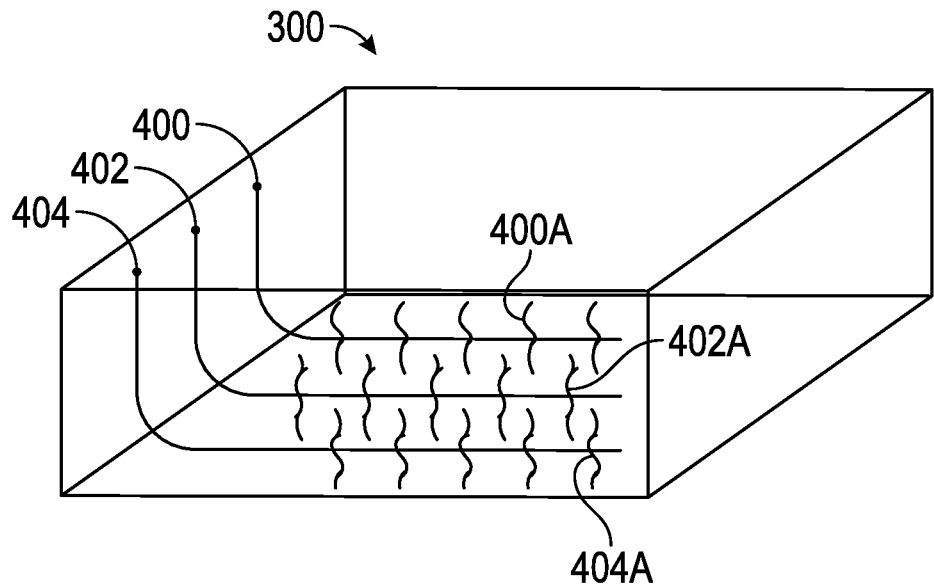
FIG. 4A is a perspective view of an illustrative multi-well development featuring zippered fractures, in accordance with embodiments.

FIG. 4A is a perspective view of an illustrative multi-well development having fractures in a pattern that may be desirable for enhanced hydrocarbon production. Specifically, target formation 300 contains multiple boreholes 400, 402 and 404. Each of these boreholes has been fractured in a zippered fashion, meaning that the fractures associated with borehole 400 interleave in an alternating fashion with the fractures associated with borehole 402. The zippered nature of these fractures is more easily viewed in the top-down view provided in FIG. 4B.

Figure 4B:
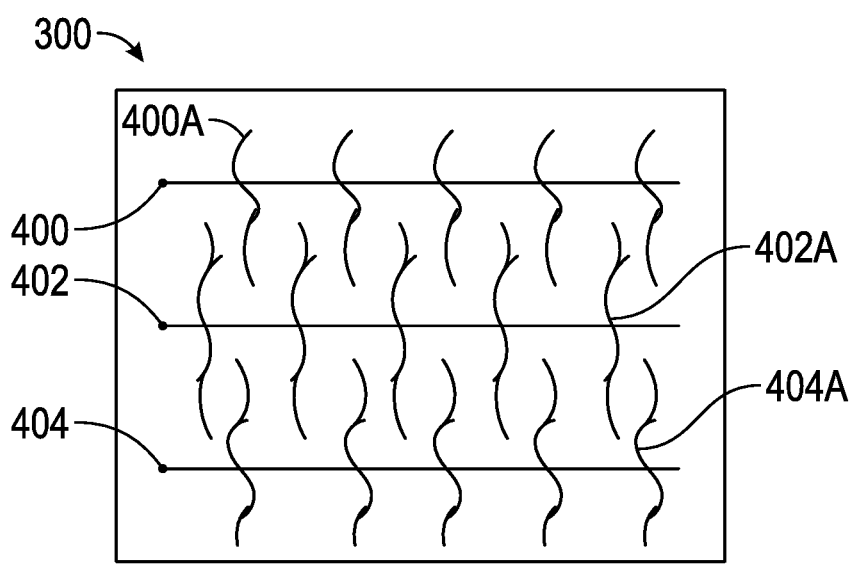
FIG. 4B is a top-down view of the multi-well development of FIG. 4A, in accordance with embodiments.

The zippered fractures shown in FIGS. 4A-4B do not overlap or have any other apparent defects that would impair hydrocarbon drainage from boreholes 400, 402 and 404. Multi-well fields that have not yet been fully fractured, however, may present numerous challenges that make it difficult to achieve the even zippered fracture pattern shown in FIGS. 4A-4B. Some of these challenges include formations with hostile material properties; adjacent, non-parallel boreholes that complicate even zippering despite fractures along each borehole being evenly spaced; pre-existing boreholes that have already been fractured differently than the way in which an oilfield operator wishes to fracture remaining boreholes adjacent to the pre-existing boreholes; and specified parameters (e.g., desired fracture lengths, locations and spacing; maximal and minimal fracture lengths, locations and spacing) that may be difficult to satisfy in a given set of downhole conditions.

Figure 5A:
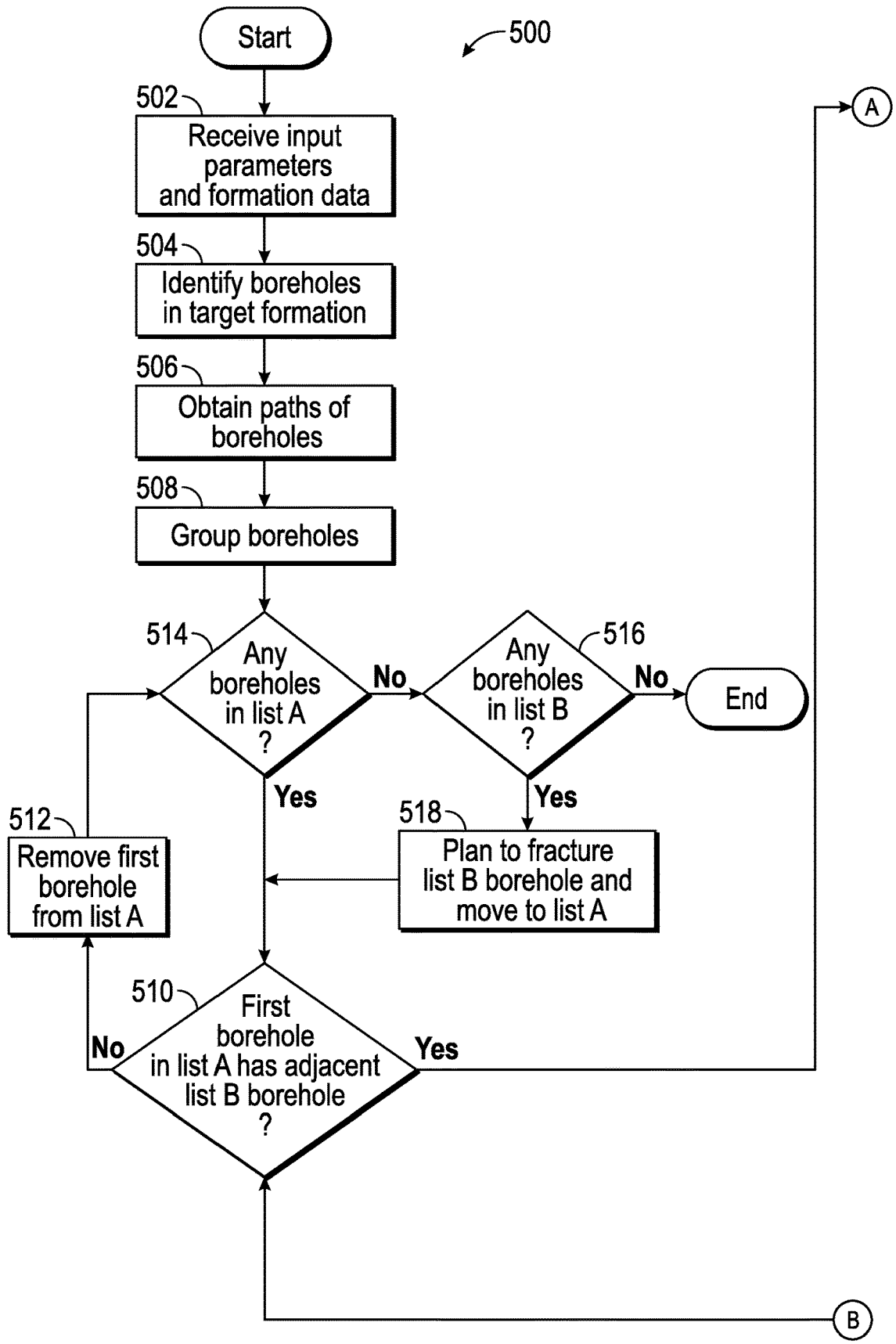
FIG. 5A is a flow diagram of an illustrative algorithm for developing the aforementioned multi-well zippered fracturing plans, in accordance with embodiments.
Figure 5A:
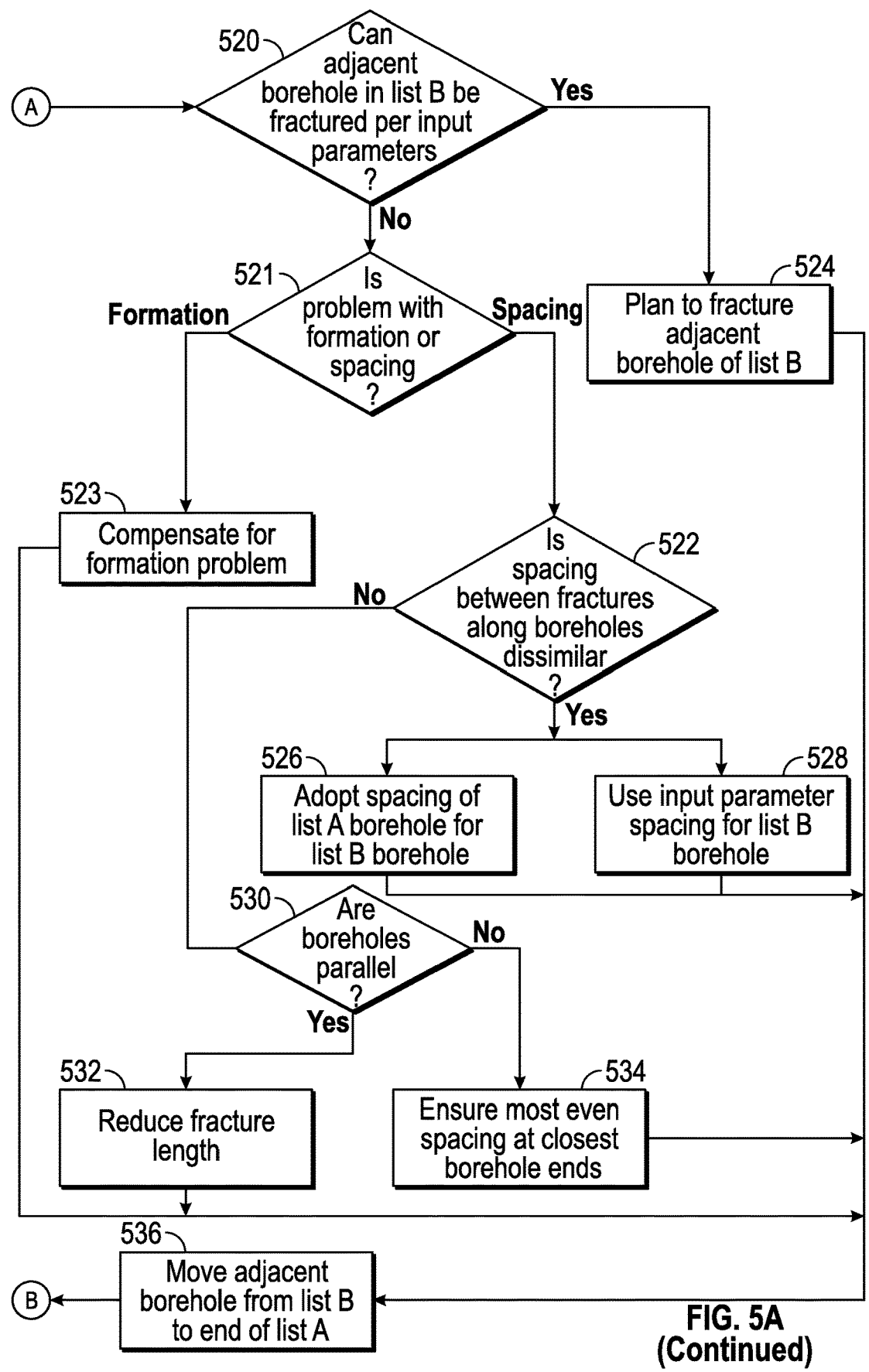

The illustrative method 500 shown in the flow diagram of FIG. 5A presents an illustrative solution to these challenges. In particular, the method 500 embodies an automatable technique for generating an integrated fracturing plan for a multi-well field in which some boreholes already exist and have already been fractured. The method 500 also is useful to generate a zippered fracturing plan for a multi-well field in which some boreholes do not yet exist but have been planned and whose fracturing plan would be infeasible to alter.

The method 500 may be encoded as software on, e.g., computer readable media 214 or 216 as shown in FIG. 2. Such software also may be stored in distributed or unified databases 210 or on the workstation 202 itself. The method 500 may be performed exclusively by processing logic executing the software, although portions of the method 500 may be performed by a human. When implemented as software, the method 500 enables a computer to rapidly consider an extensive amount of formation data, input parameters and other variables in developing fracturing plans.

Referring now to FIGS. 2 and 5A, method 500 begins with receiving or accessing input parameters and formation data (step 502). The input parameters and formation data may be communicated to the computer workstation 202 via input devices (e.g., keyboard 206 and mouse 208), using computer readable media (e.g., CD/DVD 214 or thumb drive 216), or via the Internet or network 212. These input parameters specify requirements with which specific borehole fractures must comply. For instance, and without limitation, the input parameters may specify target lengths, spacing, and locations of certain fractures. Locations of fractures are more specific than spacing of fractures because locations specify absolute positions of fractures while spacing merely specifies the relative positions of multiple fractures with respect to each other. The input parameters may specify acceptable deviations from the target lengths, spacing, and locations. Other types of input parameters also are contemplated.

Formation data specifies characteristics of the target formation 300 (as shown in FIGS. 3, 4A and 4B)—that is, of the earth surrounding the borehole. The formation data in some cases comprises a significant amount of information about the bed type, which aids in classifying it as a confining bed or reservoir rock. Formation data may include, without limitation, rock permeability, porosity mineral distributions and counts, locations and paths of existing boreholes and planned boreholes (along with fracturing information associated with all such boreholes), known hydrocarbon traps and pockets, hydrocarbon seals, locations of subsurface fluid contacts, and physical and chemical properties of the hydrocarbons and water in the formation. The software code associated with method 500 may be adjusted by one of ordinary skill in the art to process and use different types of formation data that may be provided.

The method 500 further comprises identifying boreholes in target formations (step 504) and obtaining paths of such boreholes (step 506). As explained, such boreholes may already have been drilled or they may only be planned. This information may be provided as part of the formation data in step 502, or the information may be provided independently of the formation data—for instance, the workstation 202 may access this information from databases 210, from another source via the Internet or networks 212, or via storage devices 214 and/or 216 and input devices 206 and/or 208.

Once input parameters, formation data, and information concerning existing or planned boreholes have been obtained, the method 500 comprises grouping the boreholes (step 508). More specifically, in some embodiments, the boreholes—whether existing or planned—are grouped (i.e., divided) into two lists. One list—the "fractured list," shown as "List A" in FIGS. 5A and 5B—identifies existing boreholes that have already been fractured and planned boreholes having fracturing plans that cannot or must not be altered. The other list—the "non-fractured list," shown as "List B" in FIGS. 5A and 5B—identifies existing and planned boreholes that have not yet been fractured. Each list may identify boreholes in any desired order. Variations and equivalents on this listing technique are contemplated and are included within the scope of this disclosure.

The method 500 next comprises determining whether any boreholes are present in List A (step 514). If so, control of the method 500 passes to step 510, described below. Otherwise, the method 500 comprises determining whether any boreholes are present in List B (step 516). If not, then all boreholes have fracturing plans, and the method ends. Otherwise, the method 500 comprises planning to fracture the List B borehole in accordance with input parameters and formation data and then moving that borehole to List A (step 518). Control of method 500 then passes to step 510.

The method 500 next comprises determining whether the first borehole in List A has an adjacent borehole anywhere in List B (step 510). Stated in another way, the method comprises determining whether the fractured borehole listed at the top of List A has a physically adjacent, non-fractured borehole present anywhere in List B. In some embodiments, two parallel (or substantially parallel) boreholes are adjacent to each other if the average distance between the parallel portions of the boreholes is between 1.2 and 2.2 times the length of fracture that will be created between those boreholes. In some embodiments, the average distance between the parallel portions of the boreholes may fall within a different range—for instance and without limitation, between 1 and 2 times the fracture length. In some embodiments, the average distance may be measured in a different manner—for instance and without limitation, it may include only the distances between the parallel portions of the boreholes as measured at the beginnings and ends of such parallel portions. Other definitions of "adjacent" also may be used. If List B contains no such adjacent boreholes, the first borehole in List A is removed from List A (step 512). The borehole is removed from List A because the lack of an adjacent, non-fractured borehole in List B signifies that the borehole in List A has fractures that do not impact any of the non-fractured boreholes in List B. Thus, the borehole in List A has no apparent, immediate impact on any of the boreholes in List B and thus can be safely removed from List A. Control of the method then passes to step 514.

Input parameters, unlike formation data, are typically requirements with which fractures should comply. For instance, one input parameter may specify a target length of a particular fracture and may further specify an acceptable range of lengths should the target length be unattainable. Formation data, on the other hand, are data about the formation surrounding the borehole. Examples of formation data are provided above and are not repeated here. The formation data, in at least some embodiments, do not constitute specific requirements for the fractures; instead, they inform as to the conditions in the earth formations surrounding the borehole. The formation data is used in tandem with the input parameters and any other available information to determine an optimal fracturing plan. Merely as an example, formation data may indicate that the formation near a particular orifice in a borehole is particularly impermeable and will be difficult to properly fracture. In this instance, processing logic implementing the method 500 may determine (for example, at step 520, described below) that the best course of action is to abandon efforts to fracture the earth near that particular orifice to the target length and instead to choose a different fracture length within the acceptable range specified by the input parameters.

Returning to FIG. 5A, if the determination at step 510 is affirmative—that is, the first borehole that appears in List A has an adjacent borehole in List B—the method 500 comprises determining whether the adjacent borehole in List B can be zipper fractured in accordance with the input parameters (taking into account relevant formation data) without fractures overlapping with those of the first borehole in List A (step 520). Step 520 may be tailored by a software programmer coding the method 500 in any number of ways. For instance, software implementing the method 500 may, in some embodiments, assign priorities to these requirements wherein non-overlap of fractures may take precedence over meeting input parameters, and meeting input parameters may take priority over making adjustments in light of relevant formation data. Similarly, the method 500 may evaluate formation data to determine whether one or more input parameters can or cannot be satisfied.

If the determination of step 520 is affirmative, the method 500 comprises planning to fracture the adjacent borehole of List B consistent with the input parameters and formation data and ensuring that fractures do not overlap (step 524). These components of step 520 may be prioritized and/or adjusted, as explained. Additional requirements also may be added. If the determination of step 520 is negative, however, the method 500 comprises determining whether the problem identified at step 520 relates to the formation surrounding the borehole or to the input parameters and spacing (step 521). If the issue relates to the formation, the method 500 comprises addressing the issue by making necessary adjustments to the fracture locations, lengths, and/or spacing of the borehole from List B to compensate for the formation problem (step 523). For instance, instead of fracturing at a target length as specified in the input parameters, formation data regarding permeability of rock adjacent to the borehole from List B may require a shorter fracture length. Any such suitable adjustments may be made, taking into account input parameters, formation data and fractures of nearby boreholes. Control of the method 500 then passes to step 536, described below.

If the issue at step 521 is determined to relate to the input parameters or fracture spacing, the method 500 comprises determining whether the spacing between fractures along the boreholes from Lists A and B is dissimilar (step 522). (The default spacing for fractures along the borehole from List B is the target spacing specified as an input parameter.) Dissimilarity of spacing may be defined by the entity implementing the method 500 or writing software that performs the method 500. Such a definition would account for not only the spacing of the fractures along the two boreholes, but also the lengths of the boreholes themselves, since a small difference in spacing may be insignificant for boreholes of shorter lengths compared to boreholes of longer lengths.

If the boreholes' fracture spacing is dissimilar (step 522), the method 500 comprises two potential courses of action. One possibility is to adopt the spacing of the fractures along the borehole from List A for fractures along the borehole from List B (step 526). This option eliminates problems associated with a mismatch in spacing, resulting in fractures from both boreholes that interleave with each other in an even, zippered fashion. Alternatively, the method 500 comprises using the target input parameter spacing (or a spacing within the acceptable range specified by the input parameters) for the borehole from List B and planning to align the fractures of both boreholes so that the spacing between the zippered fractures is most even near the center of the fractures along the borehole from List B (step 528).

If the determination at step 522 is negative, the method 500 comprises determining whether the boreholes from List A and B are parallel to each other (step 530). If they are parallel, it is likely that the existing or planned fractures for the borehole from List A are excessively long, and so the method 500 comprises planning for the fractures to be shorter in length (e.g., by adjusting the force of fracturing fluid used or by reducing the amount of proppant used in the fracturing fluid) (step 532). If they are not parallel (step 530), the method 500 comprises ensuring that the most even spacing of the fractures occurs at the ends of the boreholes that are closest to each other (step 534). This ensures that the portions of the boreholes at which the fractures do not interleave in an even, zippered fashion are also the portions of the boreholes that are farthest away from each other, thereby mitigating the effects of such uneven spacing and reducing the likelihood of overlapping fractures or other, similar problems.

Regardless of whether step 523, 524, 532 or 534 is performed, the method 500 comprises moving the adjacent borehole from List B to List A, since a fracturing plan for the borehole from List B has been developed (step 536). Control of the method 500 then returns to step 510.

Method 500 of FIG. 5A shows how one zippered fracturing plan may be created. In some embodiments, however, step 502 of method 500 is repeated one or more times to monitor for modifications to the input parameters and formation data. If any alterations to the input parameters or formation data are identified, some or all of the method 500 may be repeated to revise existing zippered fracturing plans to account for such alterations. In this way, software implementing the method 500—when executed by a processor—provides a "real-time" zippered fracturing plan that is dynamically updated whenever input parameters or formation data are modified, thus immediately demonstrating how such modifications impact the zippered fracturing plan. Once a zippered fracturing plan has been generated based on a satisfactory set of input parameters and formation data, the plan is implemented by fracturing one or more boreholes in accordance with the plan.

Figure 5C:
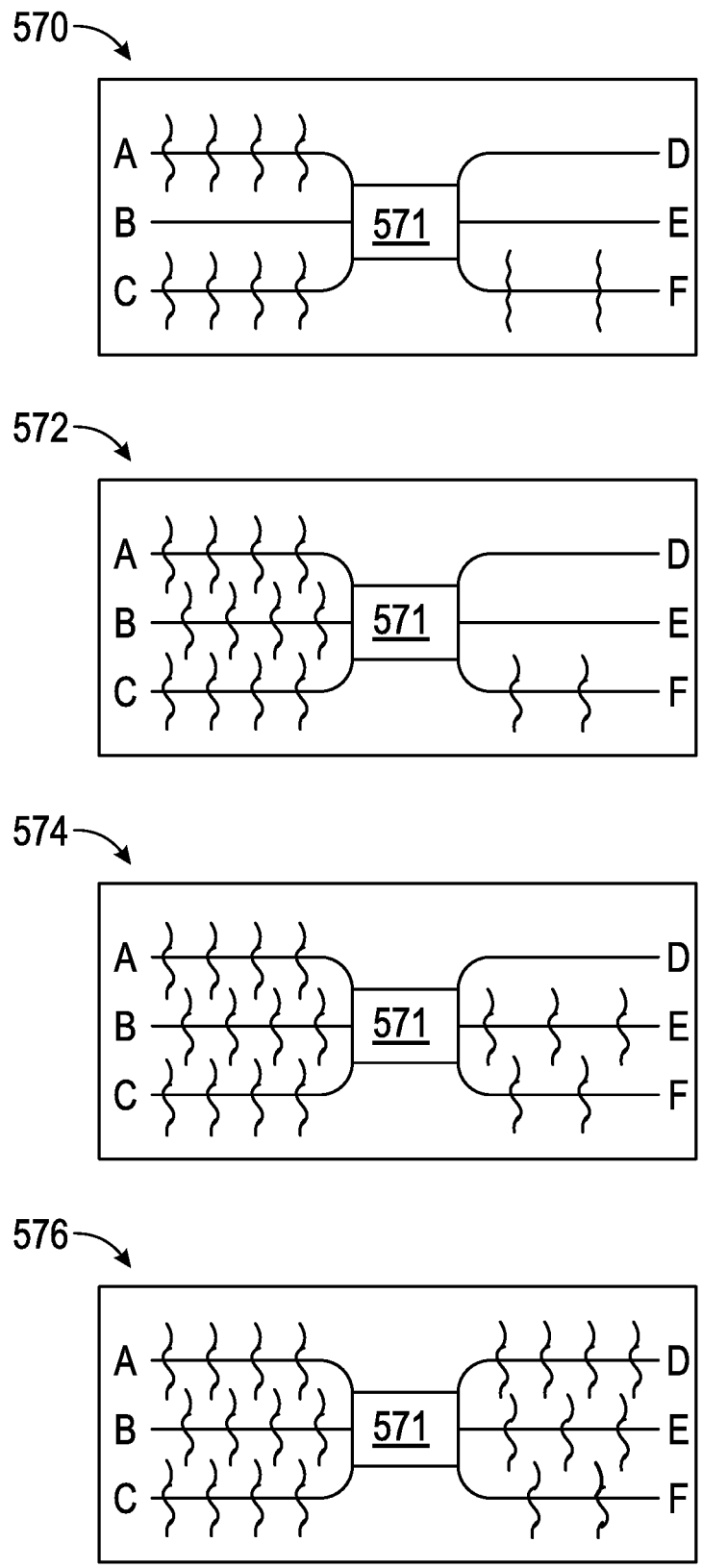

FIGS. 5B and 5C together show an illustrative implementation of the method 500. Specifically, FIG. 5B shows fracturing classification tables 550, 552, 554, 556, 558, 560, 562, 564, 566 and 568. FIG. 5C shows multi-well zippered fracturing plans 570, 572, 574 and 576 in various stages of completion (plan 576 being essentially complete). Each of these plans shows a single drilling pad 571 associated with boreholes A-F. As shown in plan 570, boreholes A, C and F are existing boreholes that are already fractured (or are planned boreholes that are required to be fractured as shown). The fractures for boreholes A and C are similar in length, location and spacing, while the fractures for borehole F are similar in length but not location/spacing. Table 550 reflects the fracturing state of each of the boreholes. Specifically, List A identifies boreholes A, C and F as fractured, and List B identifies boreholes B, D and E as being non-fractured.

Refer now to plan 570, table 550 and FIG. 5A. Borehole B, which is non-fractured and belongs in List B, is adjacent to Borehole A, which is fractured and belongs in List A. Thus, step 510 of method 500 is determined to be affirmative. Further, because the fractures of Borehole B can be evenly interleaved with the fractures of Boreholes A and C in accordance with the input parameters and formation data and without overlapping with other fractures, step 520 is answered in the affirmative and Borehole B is fractured accordingly (step 524; plan 572). Borehole B is then re-classified as a fractured borehole and is thus moved from List B to the end of List A (step 536; table 552).

The method 500 then resumes at step 510, at which it is determined that the first borehole in List A—that is, Borehole A—has no adjacent borehole in List B. Thus, Borehole A is removed from List A and discarded as shown in table 554. Borehole C also lacks an adjacent borehole in List B, so it, too, is removed from List A and discarded as shown in table 556.

Borehole F, however, has an adjacent borehole in List B—that is, Borehole E (step 510). Assuming that the input parameters specify a fracture spacing identical to that of Boreholes A, B and C, Borehole E cannot be fractured with the spacing specified in the input parameters due to the relatively wider spacing of Borehole F (plan 572). Accordingly, one course of action is to adopt the spacing already used in Borehole F (step 526), as shown in plan 574. Although the spacing used to fracture borehole E is not the same as that specified in the input parameters, to the extent possible, other input parameters should still be complied with, formation data should still be considered, and overlaps with other fractures should be avoided. Borehole E is then moved from List B to the end of List A (step 536; table 558).

Because Borehole F has no remaining adjacent boreholes in List B, it is discarded from List A (step 512; table 560). Borehole B is removed from List A for the same reason (step 512; table 562). Borehole E, however, has an adjacent borehole in List B—that is, Borehole D (step 510). The inquiry at step 520 cannot be answered in the affirmative, because—were the target spacing specified in the input parameters adopted for Borehole D without any adjustment, the spacing of fractures between Boreholes D and E would be suboptimal. Thus, because the inquiry at step 520 is answered negatively, the inquiry at step 521 is resolved as a problem with input parameters, and the inquiry at step 522 is answered affirmatively, the method 500 comprises adjusting the locations of the fractures along Borehole D such that the spacing between the fractures of Boreholes D and E is most even toward the center of the boreholes, as shown in plan 576. Borehole D is then moved from List B to the bottom of List A (step 536; table 564). Because all boreholes have now been included as part of the fracturing plan as shown in plan 576, the inquiries at step 510 for both Boreholes E and D are answered negatively, they are both removed from List A, and the method 500 is complete (tables 566, 568).

Numerous other variations and modifications will become apparent to those skilled in the art once the above disclosure is fully appreciated. For example, the steps shown in method 500 are merely illustrative. Various additions, subtractions and other modifications may be made as desired and appropriate. Similarly, not all fracturing plans that fall within the scope of this disclosure comprise a zippered pattern. The techniques described herein may be applied to both zippered and non-zippered fracturing schemes. It is intended that the following claims be interpreted to embrace all such variations, modifications and equivalents.

The following is claimed:

1. A computer-readable medium storing software code, the software code, when executed, causes a processor to:
   generate from a data source containing a list of records of boreholes and associations between fractures and the listed boreholes, a first list of records of boreholes in a target formation, at least some of the records of boreholes in the first list including associations with one or more fractures;
   generate from the data source a second list of records of boreholes in the target formation, at least some of the records of boreholes in the second list including no associations with fractures;
   for a selected record of a fractured borehole in the first list, identify a record of a corresponding non-fractured borehole in the second list, such that a location of the fractured non-fractured borehole identified in the selected record is adjacent to a location of selected fractured borehole in the target formation identified in the selected record;
   remove the record of the identified non-fractured borehole from the second list and add the record of the identified non-fractured borehole to the first list; and
   determine a zippered fracturing plan for the identified non-fractured borehole in accordance with input parameters specifying desired fracture length and spacing; and
   wherein the identified non-fractured borehole is fractured by equipment other than the processor based on the plan.

2. The medium of claim 1, wherein the code causes the processor to remove the record of the selected fractured borehole from the selected fracture borehole's position in the first list.

3. The medium of claim 1, wherein, to determine the zippered fracturing plan for the identified non-fractured borehole, the processor determines potential fracture locations along the identified non-fractured borehole.

4. The medium of claim 1, wherein, when the first list becomes empty, the processor assigns potential fracture locations to a selected non-fractured borehole from the second list in accordance with the input parameters and subsequently re-locates the record of the selected non-fractured borehole from the second list to the first list.

5. The medium of claim 1, wherein, to determine the zippered fracturing plan for the identified non-fractured borehole, the processor selects a fracture length that is shorter than the desired fracture length when using the desired fracture length would cause overlap with another fracture.

6. The medium of claim 1, wherein, to determine the zippered fracturing plan for the identified non-fractured borehole, the processor determines locations for fractures along the identified non-fractured borehole so that spacing between zippered fractures of the selected fractured borehole and the identified non-fractured borehole is most even at ends of the selected fractured borehole and the identified non-fractured borehole that are closest to each other.

* * * * *